(12) United States Patent
Kosar

(10) Patent No.: US 9,327,247 B2
(45) Date of Patent: May 3, 2016

(54) CAUSTIC RESISTANT MEMBRANE

(75) Inventor: Walter Kosar, Pottstown, PA (US)

(73) Assignee: Arkema Inc., King of Prussia, PA (US)

( * ) Notice: Subject to any disclaimer, the term of this patent is extended or adjusted under 35 U.S.C. 154(b) by 230 days.

(21) Appl. No.: 12/515,628

(22) PCT Filed: Oct. 29, 2007

(86) PCT No.: PCT/US2007/082795
§ 371 (c)(1),
(2), (4) Date: May 20, 2009

(87) PCT Pub. No.: WO2009/091351
PCT Pub. Date: Jul. 23, 2009

(65) Prior Publication Data
US 2011/0017661 A1    Jan. 27, 2011

Related U.S. Application Data

(60) Provisional application No. 60/860,374, filed on Nov. 21, 2006.

(51) Int. Cl.
B01D 71/34 (2006.01)
B01D 71/40 (2006.01)
B01D 71/80 (2006.01)
C02F 1/44 (2006.01)
B01D 69/02 (2006.01)

(52) U.S. Cl.
CPC ............... *B01D 71/34* (2013.01); *B01D 69/02* (2013.01); *B01D 71/40* (2013.01); *B01D 71/80* (2013.01); *B01D 2325/30* (2013.01); *C02F 1/44* (2013.01)

(58) Field of Classification Search
None
See application file for complete search history.

(56) References Cited

U.S. PATENT DOCUMENTS

| | | | |
|---|---|---|---|
| 4,377,481 A | 3/1983 | Jakabhazy | |
| 4,384,047 A | 5/1983 | Benzinger et al. | |
| 5,066,401 A * | 11/1991 | Muller et al. | 210/500.35 |
| 5,277,851 A | 1/1994 | Ford et al. | |
| 5,318,417 A | 6/1994 | Kopp et al. | |
| 5,395,570 A | 3/1995 | Kopp et al. | |
| 5,698,101 A | 12/1997 | Kopp et al. | |
| 6,013,688 A | 1/2000 | Pacheco et al. | |
| 6,074,718 A | 6/2000 | Puglia et al. | |
| 6,110,309 A | 8/2000 | Wang et al. | |
| 6,734,386 B1 | 5/2004 | Lauterbach et al. | |
| 2004/0092661 A1 * | 5/2004 | Hedhli et al. | 525/55 |
| 2004/0135274 A1 * | 7/2004 | Matsuda et al. | 264/28 |
| 2006/0030685 A1 * | 2/2006 | Passade Boupat et al. | 526/319 |

FOREIGN PATENT DOCUMENTS

JP  2005146230   11/2003
JP  2006205067   1/2005

* cited by examiner

*Primary Examiner* — Krishnan S Menon
(74) *Attorney, Agent, or Firm* — Thomas F. Roland

(57) ABSTRACT

The invention relates to caustic resistant membranes formed by solvent casting a blend of one or more polyvinylidene fluoride polymers with one or more acrylic polymers.

12 Claims, 2 Drawing Sheets

CAUSTIC RESISTANT MEMBRANE

This application claims benefit, under U.S.C. §119 or §365 of U.S. 60/860,374, filed Nov. 21, 2006 and PCT/US2007/082795 filed Oct. 29, 2007.

FIELD OF THE INVENTION

The invention relates to caustic resistant membranes formed by solvent casting a blend of one or more polyvinylidene fluoride polymers with one or more acrylic polymers.

BACKGROUND OF THE INVENTION

Polyvinylidene fluoride (PVDF) membranes are increasingly being used in microfiltration and ultrafiltration applications, and have been described in US patents such as U.S. Pat. Nos. 6,013,688 and 6,110,309. PVDF resin is very chemically and biologically inert and has outstanding mechanical properties. It is resistant to oxidizing environments, such as chlorine and ozone, which are widely used in the sterilization of water. The PVDF membranes are also highly resistant to attack by most mineral and organic acids, aliphatic and aromatic hydrocarbons, alcohols, and halogenated solvents. This resin is soluble in several solvents and may be readily solution cast to form porous membranes using a phase inversion method. PVDF membranes may be cast in either flat sheet or hollow fiber configurations.

Polyvinylidene fluoride microporous membranes, generally formed as thin sheets of substantially uniform thickness, have a sponge-like internal structure containing millions of intercommunicating channels, the channels having a substantially uniform width within narrow limits. The membrane pore sizes are generally controlled to be relatively uniform over a very small range. The pore size ranges generally fall within the larger general range of from 0.01 to about 10 microns.

PVDF membranes have been modified (post membrane formation) to improve specific properties. U.S. Pat. No. 6,734,386 describes post-treatment of PVDF membranes by polymerizing acrylic monomers on the surface of the membrane. Post-treatment reactions are complex and add costly steps to the manufacturing process.

PVDF is known to form miscible alloys with various acrylic resins. These include polymethylmethacrylate (PMMA), polymethylacrylate (PMA), polyethyl-methacrylate (PEMA), polyethylacrylate (PEA), and copolymers of these resins with other acrylic co-polymers. These miscible blends are stable over long periods. The acrylic polymers and co-polymers are not water soluble, and will not migrate with prolonged water exposure. (Polyvinylpyrrolidone (PVP) is another polymer resin that is miscible with PVDF, however, this resin is water-soluble and will migrate out of a blend on prolonged exposure to water. Therefore, PVDF-PVP blends will not be stable over long periods in water filtration use.) The acrylic resins have good chemical resistance of their own, and specifically will not undergo destructive dehydrofluorination that occurs with PVDF on exposure to caustic solutions.

U.S. Pat. No. 4,377,481 describes the use of PVDF-acrylic resin blends for polymeric membranes, in which the acrylic resin is a copolymer containing at least one monomer that if polymerized would be incompatible with PVDF—for example (meth)acrylic monomers containing sulfonic acid or amino groups.

U.S. Pat. No. 6,074,718 describes hollow fiber membranes of PVDF that may also be blends with a second polymer. The methyl methacrylate polymer described is a pore-forming material, which is extracted out from the final membrane. In this application it is not intended to remain in the final membrane, thus contributing no material benefit to the membrane.

One major limitation of PVDF membranes is caustic resistance due to attack by bases such as sodium hydroxide, potassium hydroxide, organic amines, and other bases. Sodium hydroxide solutions are often used for cleaning filtration membranes to remove biological fouling. This cleaning cycle reduces the lifetime of PVDF membranes and may lead to membrane failure. There is a need for a PVDF membrane with increased resistance to caustic cleaning to greatly improve the performance and lifetime of PVDF membrane modules. Filtration module lifetime is a major economic consideration for membrane filtration installations.

Surprisingly it has been found that membranes made of homogeneous PVDF-acrylic blends have improved caustic resistance.

SUMMARY OF THE INVENTION

The invention relates to a caustic-resistant membrane comprising a homogeneous polymer blend comprising:
  a) 50 to 99 percent by weight of at least one polyvinylidene fluoride (PVDF) polymer or copolymer; and
  b) 1 to 50 percent by weight of at least one acrylic polymer.

The invention also relates to articles using this caustic-resistant membrane for the treatment of water, waste fluids, biological fluids and process fluids.

DETAILED DESCRIPTION OF THE INVENTION

Figure 1:
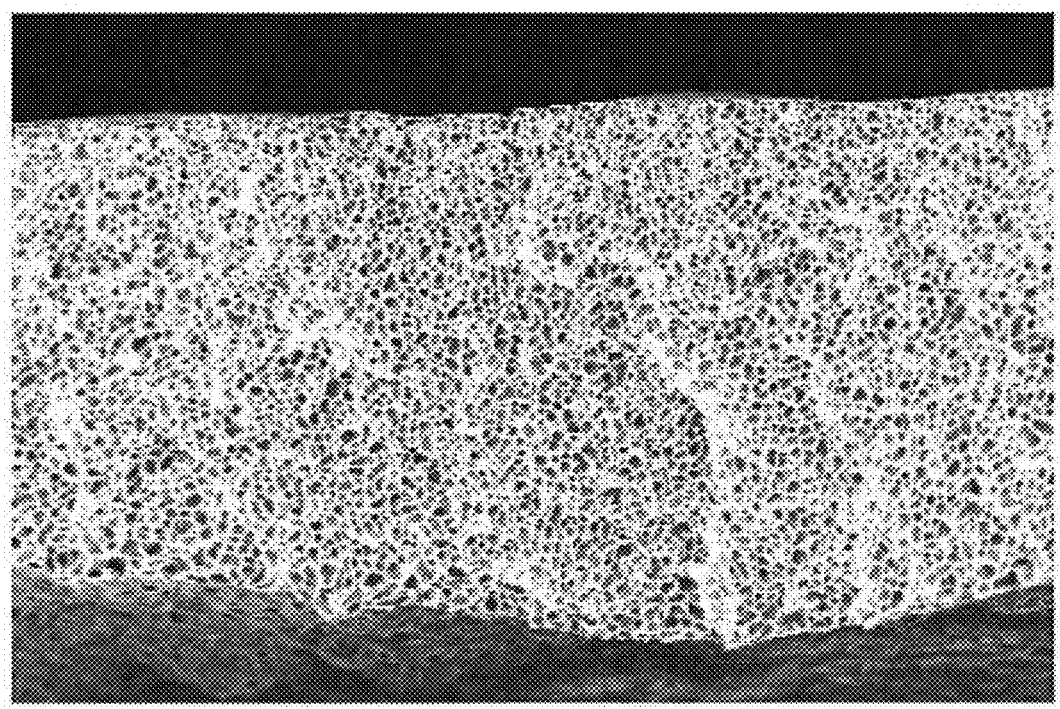
FIG. 1: Is an SEM photograph of membrane cross sections of a pure KYNAR membrane (comparative).
Figure 2:
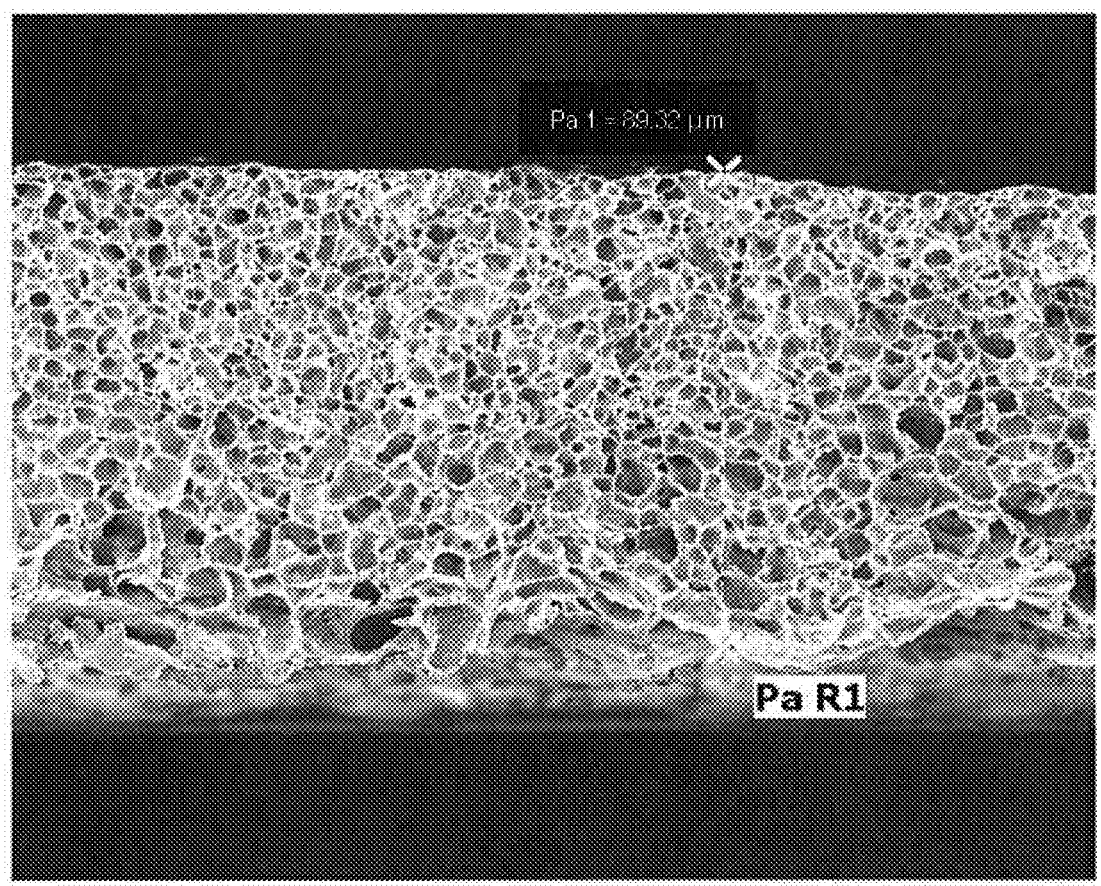
FIG. 2: Is an SEM photograph of membrane cross sections of a KYNAR-acrylic membrane. The membrane of the invention is free of voids and cracks. The SEM photos showing similar sponge-like morphology. The KYNAR-acrylic membrane does not show any polymer phase separation.

By "homogeneous" as used herein in reference to the PVDF-acrylic blends and membranes formed therefrom, is meant that in solution the PVDF and acrylic polymers form a single phase, and that in the membrane the blend is uniform The present invention involves the use of an acrylic polymer/PVDF blend for solution casting into polymeric membranes. The level of acrylic polymer in the blend is between 1 and 50 percent by weight, preferably from 10 to 25 percent by weight, with the level of PVDF at 50-99 weight percent and preferably from 75 to 90 weight percent.

The polyvinylidene fluoride resin may be one or more of either a homopolymer made by polymerizing vinylidene fluoride (VDF), and copolymers, terpolymers and higher polymers of vinylidene fluoride wherein the vinylidene fluoride units comprise greater than 70 percent of the total weight of all the monomer units in the polymer, and more preferably, comprise greater than 75 percent of the total weight of the units. Copolymers, terpolymers and higher polymers of vinylidene fluoride may be made by reacting vinylidene fluoride with one or more monomers from the group consisting of vinyl fluoride, trifluoroethene, tetrafluoroethene, one or more of partly or fully fluorinated alpha-olefins such as 3,3,3-trifluoro-1-propene, 1,2,3,3,3-pentafluoropropene, 3,3,3,4,4- pentafluoro-1-butene, and hexafluoropropene, the partly fluorinated olefin hexafluoroisobutylene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro(2,2-dimethyl-1,3-dioxole), allylic, partly fluorinated allylic, or fluorinated allylic monomers, such as 2-hydroxyethyl allyl ether or 3-allyloxypropanediol, and ethene or propene. Preferred copolymers or terpolymers are formed with vinyl fluoride, trifluoroethene, tetrafluoroethene (TFE), and hexafluoropropene (HFP).

Preferred copolymers are of VDF comprising from about 71 to about 99 weight percent VDF, and correspondingly from about 1 to about 29 percent TFE; from about 71 to 99 weight percent VDF, and correspondingly from about 1 to 29 percent HFP (such as disclosed in U.S. Pat. No. 3,178,399); and from about 71 to 99 weight percent VDF, and correspondingly from about 1 to 29 weight percent trifluoroethylene.

Preferred terpolymers are the terpolymer of VDF, HFP and TFE, and the terpolymer of VDF, trifluoroethene, and TFE, The especially preferred terpolymers have at least 71 weight percent VDF, and the other comonomers may be present in varying portions, but together they comprise up to 29 weight percent of the terpolymer.

The polyvinylidene fluoride could also be a functionalized PVDF, produced by either copolymerization or by post-polymerization functionalization. Additionally the PVDF could be a graft copolymer, such as, for example, a radiation-grafted maleic anhydride copolymer.

The PVDF polymer(s) are blended with one or more acrylic polymers. "Acrylic polymers", as used herein is meant to include polymers, copolymers and terpolymers formed from alkyl methacrylate and alkyl acrylate monomers, and mixtures thereof. The term "(meth)acrylate" is used herein to indicate either acrylate, methacrylate, or a mixture thereof. The alkyl methacrylate monomer is preferably methyl methacrylate, which may make up from 50 to 100 percent of the monomer mixture. 0 to 50 percent of other acrylate and methacrylate monomers or other ethylenically unsaturated monomers, included but not limited to, styrene, alpha methyl styrene, acrylonitrile, and crosslinkers at low levels may also be present in the monomer mixture. Other methacrylate and acrylate monomers useful in the monomer mixture include, but are not limited to, methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers. Alkyl (meth) acrylic acids such as methyl acrylic acid and acrylic acid can be useful for the monomer mixture. Preferably, the acrylic polymer is a random copolymer containing 70 to 99, and more preferably 90-99 weight percent of methyl methacrylate units, and from 1 to 30, and more preferably 1 to 10 weight percent of one or more $C_{1-4}$ alkyl acrylate units. In particular, a specific useful terpolymer is one containing about 95.5-98.5 weight percent of methylmethacrylate units, 1-3 weight percent (meth)acrylic acid units and 0.5-1.5 weight percent of ethyl acrylate units.

In another preferred embodiment, small amounts of from 0.5 to 10, and preferably from 1 to 5 weight percent of (meth) acrylic acid are used as comonomers with methylmethacrylate. The copolymer formed contains enhanced hydrophilicity due to the presence of the acid functionality.

In another embodiment, the acrylic polymer is a block co-polymers which may be a di- or tri-block copolymer. The block copolymer structure can provide an improved morphological control in membrane formation—leading to controlled domain size, and a controlled micro-structure architecture. This leads to an improved porosity control and improved stability, as well as providing a better distribution of functional groups leading to excellent mechanical properties. The acrylic block copolymers can be made using controlled radical polymerization techniques including, but are not limited to, atom transfer radical polymerization (ATRP), reversible addition fragmentation chain transfer polymerization (RAFT), nitroxide-mediated polymerization (NMP), boron-mediated polymerization, and catalytic chain transfer polymerization (CCT). A process for preparing copolymers in the presence of a stable free radical from the nitroxide family is described in U.S. Pat. No. 6,255,402. Nitroxide-mediated stable radicals have been used to produce controlled block copolymers, as described in U.S. Pat. No. 6,255,448, and US 2002/0040117. These references are incorporated herein by reference.

In principle, any living or controlled polymerization technique, compatible with the monomer choices, can be utilized to make the block copolymer. One preferred method of controlled radical polymerization is nitroxide-mediated CRP. Nitroxide-mediated CRP is preferred as it allows for the use of a larger variety of monomers in the triblock copolymer, and is especially good for acrylics and acid functional acrylics. In one embodiment, a tri-block acrylic polymer is formed by a controlled radical polymerization having a center block of butyl acrylate and comprising 5 to 50 weight percent of the triblock polymer, and ends groups comprising a homopolymer or copolymer having 75 to 100 percent of methyl methacrylate and from 0 to 25 weight percent of one or more $C_{1-4}$ alkyl acrylates or acrylic acids, where the each end group makes up from 25 to 47.5 weight percent of the triblock polymer.

In general, the PVDF polymers used in the blend have molecular weights in the range of from 100,000 to 5,000,000 g/mol, and the acrylic polymers have molecular weights in the range of from 30,000 to 500,000. If the molecular weight of the acrylic polymer(s) is too high, the polymer will be too brittle for use in the membrane. When acrylic copolymers are used, having higher levels of alkyl acrylates, the Tg is lower and higher molecular weight can be tolerated.

The PVDF and acrylic polymers are admixed together with a solvent to form a blended polymer solution. The PVDF and acrylic polymers may be blended together followed by dissolution, or the polymers may be separately dissolved in the same or different solvents, and the solvent solutions blended together. Solvents useful in dissolving the solutions of the invention include, but are not limited to N,N-dimethylacetamide, N,N-diethylacetamide, N-methyl-2-pyrrolidone, N-ethyl-2-pyrrolidone, acetone, dimethyl formamide, tetrahydrofuran, methyl ethyl ketone, tetramethyl urea, dimethyl sulfoxide, triethyl phosphate, N-octyl-pyrrolidone, gamma butyrolacetone, N,N' dimethyl-trimethylene-urea, dimethylcarbonate, and mixtures thereof.

The polymer solution typically has a solids level of from 10 to 30 percent, preferably 15 to 22 and most preferably from 17 to 20 percent. The solution is formed by admixing and optionally heating at a temperature up to 80° C., and typically from 50 to 80° C.

In addition to the PVDF and acrylic polymers and solvent, other additives may be added to the polymer solution, typically at from 1 to 20 weight percent and more preferably from 5 to 10 weight percent, based on the total solution. Typical additives include, but are not limited to, pore-formers which are typically hydrophilic water extractable compounds such as metallic salts (such as lithium, calcium and zinc salts), alcohols, glycols (such as polyethylene glycol, polypropylene glycol); silica, carbon nanotubes and other nano materials which may or may not be extracted; and compounds for increasing the viscosity of the solution for ease in processing of membrane materials.

The solution viscosity can be adjusted to obtain the best processing condition. For flat sheet, the overall formulation is adjusted to obtain the best viscosity for a flat web casting. In hollow fiber formation, the process is actually a form of extrusion, and higher viscosities can be beneficial.

The PVDF/acrylic solution is then formed into membranes by typical processes known in the art, to form a flat sheet, supported flat sheet or hollow fiber membrane. In one typical process, the PVDF/acrylic solution is solvent cast and drawn down onto a substrate. This membrane may be supported or unsupported, such as being cast onto a porous support web such as a woven or non-woven polyolefin or polyester. The membrane is then formed by a phase separation process, in which the thermodynamics of the cast membrane solution are disrupted, so that the polymer gels and phase separates from the solvent. The change in thermodynamics is often begun by a partial solvent evaporation, and/or exposure of the film to a high humidity environment. The membrane is then placed in a non-solvent for the polymer—such as water, an alcohol, or a mixture thereof—and the solvent removed, leaving a porous membrane. The pore size can be adjusted through the use of additives and the polymer concentration as known in the art. For example high molecular weight additives can lead to large pore sizes, while the use of lithium salt additives can produce small pore sizes.

The PVDF/acrylic membranes of the invention are generally 75 to 200 microns, and preferably from 100 to 150 microns thick.

While not being bound by any particular theory, it is believed that the acrylic polymer in the blend concentrates in the amorphous (rather than the crystalline) regions of the polyvinylidene fluoride. Thus, the acrylic polymer serves to strengthen the weaker amorphous regions of the PVDF, leading to an improvement in properties.

Additionally, PVDF and acrylic polymers are melt miscible—showing that the blend is thermodynamically compatible in the solid state. This means that the membrane formed from the blend won't phase separate and should remain stable.

The membranes resulting from these PVDF-acrylic blends show much less discoloration on exposure to caustic solution than PVDF membranes alone. Discoloration is indicative of dehydrofluorination, which ultimately leads to loss of mechanical properties, reduced membrane life and poor separation performance. Caustic exposure refers to immersion or washing of the membranes with solutions of sodium hydroxide (or similar bases) of concentrations ranging from 0.5% to 50% at temperatures ranging from 20° C. to 90° C. These are the conditions that are often used in membrane cleaning cycles.

The membranes of the invention may be used in many applications, including but not limited to: water purification, purification of biological fluids, wastewater treatment, osmotic distillation, and process fluid filtration.

EXAMPLES

KYNAR 761 resin (12.0 g) (Arkema Inc.) was weighed out into a 250 ml jar followed by 3 g of acrylic resin (PMMA co-polymer with approximately 2% methacrylic acid). Then 77 g of dimethylacetamide was added, the jar was sealed, and put on rollers to fully dissolve the resins. Separately, a mixture of polyethylene glycol (2.5 parts, 400 MW), water (3.0 parts), and polyethylene glycol (2.5 parts, 8000 MW) were weighed out and mixed until all were fully dissolved. The KYNAR/acrylic resin solution was heated to 70° C. and stirred with an overhead stirrer. The polyethylene glycol/water solution was then added dropwise to this warm polymer solution. After addition, the mixture was left to mix for 30 minutes at 70° C. The dope solution was then degassed to remove air bubbles by pulling a mild vacuum on it. The degassed membrane dope was allowed to cool to ambient temperature prior to casting.

Membranes were Cast by the Following Procedure:

Membrane dope was poured on a clean glass plate and drawn down by drawn-down square. Wet film thicknesses ranged from 5 mils to 20 mils. The wet film was then exposed to high humidity (ambient vapors above a 65° C. water bath) from 30 sec to 2 minutes. After humidity exposure, the glass plate was immersed in the hot water bath to complete phase inversion and set the membrane. Membrane formation occurred rapidly, and the formed membrane spontaneously lifted off the glass plate.

Alternatively, the wet cast film could be quenched immediately in the hot water bath without any humidity exposure. Another alternative procedure involves quenching in ambient temperature water baths or exposing to lower humidity levels (~60% RH in a dessicator cabinet). In place of the glass plate, membranes may be cast on either a polyester release film, a polypropylene sheet, or on a non-woven polyester fabric.

The membranes were washed in water followed by an alcohol wash, then dried in air.

Additional membrane formulations were prepared as above, but with the following acrylic resins: a) a PMMA acrylic co-polymer with polyethylacrylate as the minor component; b) an acrylic triblock copolymer (b-PMMA/b-polybuylacrylate/b-PMMA in the approximate composition of 35:30:35)

Finally, a formulation was prepared with 15 g of KYNAR 761 and no added acrylic.

Membranes cast from all these formulations were tested for caustic exposure.

Caustic Exposure Test

Pieces of the membranes (~20 mm×50 mm) were cut and placed in vials. A solution of 10 weight percent sodium hydroxide in water was added to each vial. The vials were capped and shaken (not stirred) then set aside at ambient temperature. The samples were visually checked every few days. The membranes were removed after two weeks, rinsed with deionized water, then briefly soaked in isopropanol and allowed to air dry. The dried membrane samples were analyzed on a Hunter Labscan XE colorimeter for color change.

As can be seen in Table 1, pure PVDF membranes discolored on exposure to caustic solution. Depending on the type of membrane dope formulation, the reactivity occurred very rapidly (<30 minutes) or took several days to be noticeable. In either case, comparable PVDF-acrylic membranes discolored much less. Therefore, the PVDF-acrylic membranes were more caustic resistant. For the membranes shown in Table 1, the pure PVDF membrane showed red-brown discoloration (evidenced by large $\Delta E^*$) after overnight exposure. However, the membranes of the invention had a much less discoloration, evidenced by lower $\Delta E^*$ values.

TABLE 1

| Color Change Data for Caustic Treated Membranes | | | | |
|---|---|---|---|---|
| Membrane | L* | a* | b* | ΔE* |
| Kynar 761 | 67.12 | 15.46 | 26.23 | 42.49 |
| Kynar 761-PRD510A | 93.70 | 1.31 | 7.18 | 7.91 |
| Kynar 761- PLEXIGLAS 7016 IAXP | 89.74 | 3.64 | 8.89 | 11.89 |
| Kynar 761-bPMMA/ bPBA/bPMMA | 93.93 | 1.89 | 8.35 | 9.02 |

Hunter color scale

What is claimed is:

1. A caustic-resistant membrane comprising a homogeneous polymer blend consisting of:
   a) 75 to 90 percent by weight of at least one polyvinylidene fluoride (PVDF) polymer or copolymer; and
   b) 10 to 25 percent by weight of at least one acrylic polymer, wherein said acrylic polymer is selected from the group consisting of
      1) a terpolymer consisting of from 90 to 99 weight percent of methyl methacrylate monomer units, from 0.5 to 9.5 weight percent of one or more $C_{1-4}$ alkyl acrylates monomer units and 0.5 to 5 weight percent of (meth)acrylic acid monomer units, wherein the total of these acrylic monomers adds to 100%, and
      2) an acrylic block copolymer consisting of all acrylic monomers units wherein at least one end block consists of 75-100 percent by weight of methyl methacrylate units, and from 0 to 25 weight percent of one or more $C_{1-4}$ alkyl acrylates and/or (meth)acrylic acid,
wherein said membrane is microporous, having a pore size of from 0.01 to 10 microns.

2. The membrane of claim 1 wherein said PVDF polymer comprises a copolymer of 85-95 mole percent of polyvinylidene fluoride and 5 to 15 mole percent of hexafluoropropylene.

3. The membrane of claim 1 wherein said PVDF polymer has a molecular weight of from 100,000 to 5,000,000 g/mol.

4. The membrane of claim 1 wherein said acrylic polymer has a molecular weight of from 30,000 to 500,000 g/mol.

5. The membrane of claim 1, wherein said acrylic block copolymer is a triblock copolymer having a polybutyl acrylate center block and methylmethacrylate or methylmethacrylate copolymers as end blocks.

6. The membrane of claim 1, wherein the PVDF and acrylic polymer resins are pre-blended, in the appropriate ratio, by melt extrusion into a pelletized form and then subsequently used in the membrane preparation.

7. The membrane according to claim 1, wherein the PVDF and acrylic polymer resins are pre-blended, in the appropriate ratio, by melt extrusion into a pelletized form and then ground into a powder form, which is subsequently used in the membrane preparation.

8. The membrane according to claim 1, wherein the PVDF and acrylic polymer resins are pre-blended as separate powders to give a powder blend of uniform consistency in the appropriate ratio for use in the membrane formulation.

9. The membrane of claim 1, wherein said membrane is a hollow fiber membrane, a supported hollow fiber membrane, a flat unsupported membrane, or a flat supported membrane.

10. The membrane of claim 1 comprising an article for water purification, purification of biological fluids, wastewater treatment, osmotic distillation, and process fluid filtration.

11. The membrane of claim 1, wherein said terpolymer consists of from 90 to 99 weight percent of methyl methacrylate monomer units, from 0.5 to 9.5 weight percent of ethyl acrylate monomer units and 0.5 to 5 weight percent of (meth) acrylic acid monomer units, wherein the total of these acrylic monomers adds to 100%.

12. The membrane of claim 11, wherein said terpolymer consists of 95.5-98.5 weight percent of methyl methacrylate monomer units, from 1 to 4 weight percent of ethyl acrylate monomer units and 0.5 to 3.5 weight percent of (meth)acrylic acid monomer units, wherein the total of these acrylic monomers adds to 100%.

* * * * *